United States Patent [19]

Barnes et al.

[11] Patent Number: 5,626,202
[45] Date of Patent: May 6, 1997

[54] PUSH CLIP FASTENER WITH RETENTION TABS

[75] Inventors: Steven J. Barnes, Kettering; Russell Bignell, II, Fairborn, both of Ohio

[73] Assignee: ITT Automotive Electrical Systems, Inc., Auburn Hills, Mich.

[21] Appl. No.: 474,344

[22] Filed: Jun. 7, 1995

[51] Int. Cl.[6] .................................................. B60K 11/04
[52] U.S. Cl. ...................... 180/68.1; 180/68.4; 180/68.6; 465/121
[58] Field of Search .................. 180/68.1, 68.4, 180/68.6; 165/121, 122, 51; 123/41.49

[56] References Cited

U.S. PATENT DOCUMENTS

| | | | |
|---|---|---|---|
| 4,979,584 | 12/1990 | Charles | 180/68.4 |
| 5,341,871 | 8/1994 | Stelzer | 180/68.4 |
| 5,495,909 | 3/1996 | Charles | 180/68.1 |
| 5,522,457 | 6/1996 | Lenz | 180/68.1 |

*Primary Examiner*—Richard M. Camby
*Attorney, Agent, or Firm*—Thomas N. Twomey; J. Gordon Lewis

[57] ABSTRACT

A clip member is configured for selective engagement with a receiving member having an aperture and a predetermined material thickness between a front surface and a back surface. The clip member includes a base surface and pair of substantially parallel tangs projecting outwardly from the base surface with each tang having an engaging barb. A pair of cantilevered spring tabs are adjacent the tangs and extend from the base surface substantially parallel thereto. The spring tabs have a tab engaging surface projecting above the base surface defining a distance to a barb engagement surface less than the thickness of the receiving member. When the clip member is pressed into the aperture, the tangs are bent as they enter through the front surface. The tab engaging surfaces engage the front surface of the receiving member before the barb engagement surfaces reach the rear surface. The spring tabs deflect with further movement of the clip member into the receiving member and develop a spring load therebetween. The tangs snap back and the barb engagement surfaces engage the rear surface when the barbs exit the aperture, thereby positively retaining the receiving member and maintaining the spring load between the clip member and the receiving member.

1 Claim, 2 Drawing Sheets

PUSH CLIP FASTENER WITH RETENTION TABS

FIELD OF THE INVENTION

The present invention relates to push clip fasteners, and more specifically to relatively rigid push clip fasteners which deflect in a substantially elastic manner when being engaged.

BACKGROUND

Push clip fasteners having clip members with substantially parallel tangs having engaging barbs at the tips which are integrated into molded plastic parts, such as a first portion of a fan shroud, to engage an aperture in a mating part, such as a second portion of the fan shroud, are known. While such a configuration is adequate to keep the parts joined together, it can result in vibration and chatter between the two mating parts. Even the smallest gap between the retained part and the engaging clip allows the parts to move relative to each other, resulting in vibration and chatter. It is infeasible to produce assemblies with no gap because of the manufacturing and assembly tolerances associated with the separate parts.

It is desired to provide an improved push clip fastener eliminating the vibration and chatter between the connected parts.

SUMMARY OFT HE INVENTION

A clip member configured for selective engagement with a receiving member having an aperture and a predetermined material thickness between a front surface and a back surface is disclosed. The clip member includes a base surface and pair of substantially parallel tangs projecting outwardly from the base surface with each tang having an engaging barb. A pair of cantilevered spring tabs are adjacent the tangs and extend from the base surface substantially parallel thereto. The spring tabs have a tab engaging surface projecting above the base surface, defining a distance to barb engagement surface less than the thickness of the receiving member. As the clip member is pressed into the aperture, the tangs are bent as they enter through the front surface. The tab engaging surfaces engage the front surface of the receiving member before the barb engagement surfaces reach the rear surface. The spring tabs deflect with further movement of the clip member into the receiving member and develop a spring load therebetween. The tangs snap back and the barb engagement surfaces engage the rear surface when the barbs exit the aperture, thereby positively retaining the receiving member and maintaining the spring load between the clip member and the receiving member.

Push clip fasteners having cantilevered spring tabs eliminate vibration and chatter between the joined parts.

DESCRIPTION OF A PREFERRED EMBODIMENT

Figure 1:
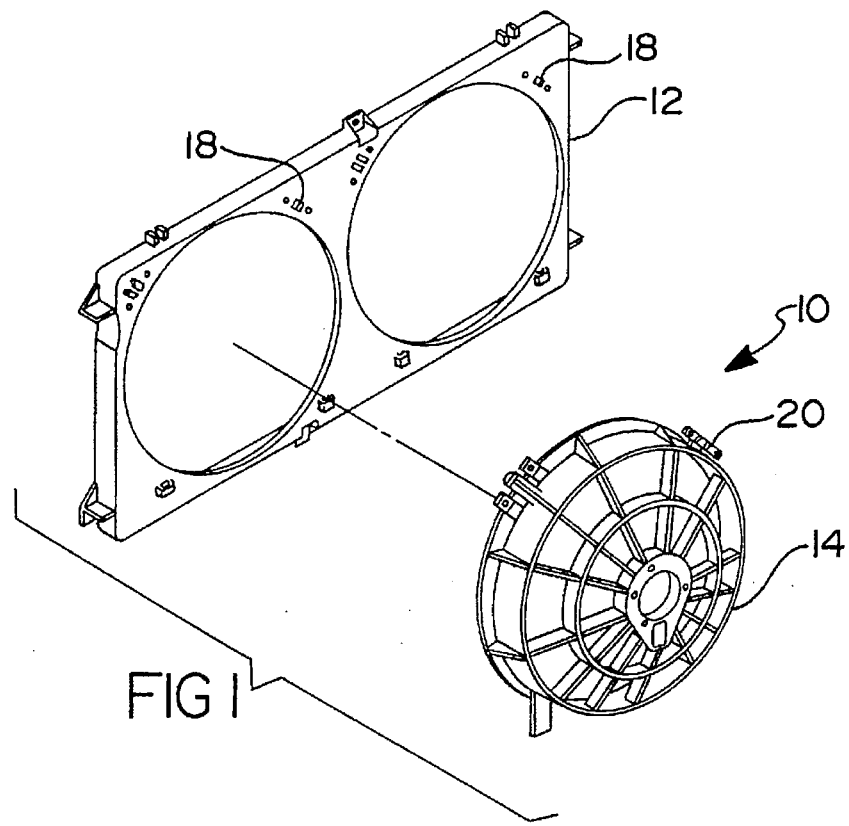
FIG. 1 is an exploded perspective view of a fan shroud with the claimed invention.

A fan shroud 10 is shown in FIG. 1 with a first portion 12 which mounts to a motor vehicle radiator (not shown), and a second portion which mounts to the first portion. Both first portion 12 and second portion 14 are injection molded of a plastic such as nylon.

Figure 2:
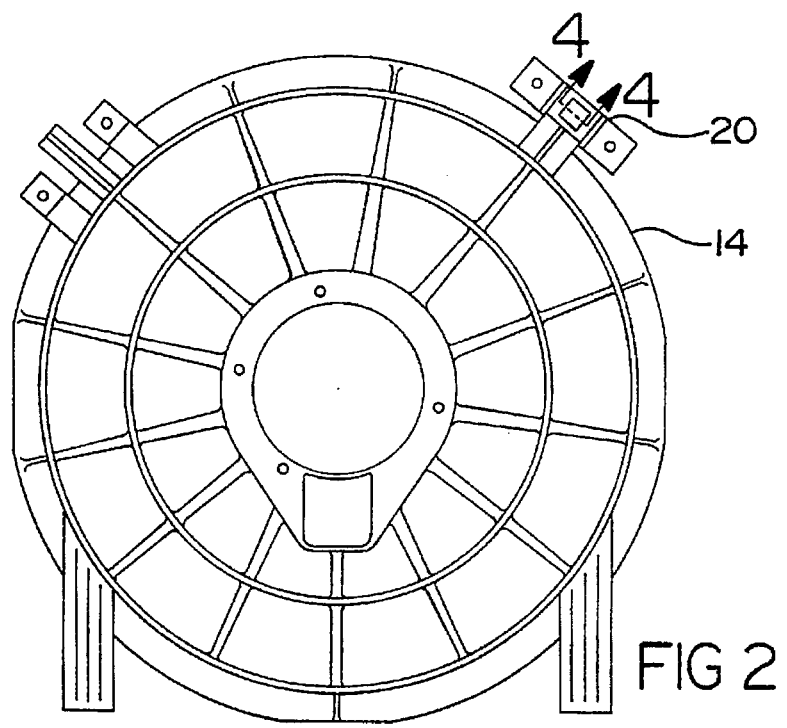
FIG. 2 is an enlarged elevational view of one portion of the fan shroud of FIG. 1.
Figure 3:
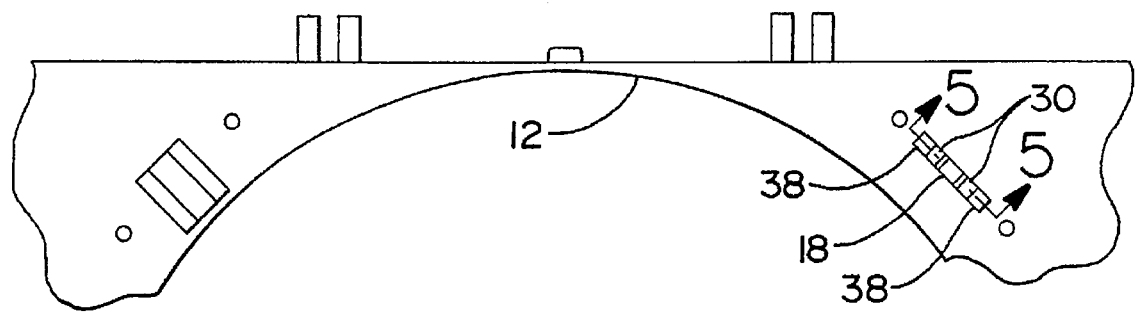
FIG. 3 is an enlarged cut away elevational view of a top section of another portion of the shroud of FIG. 1.
Figure 4:
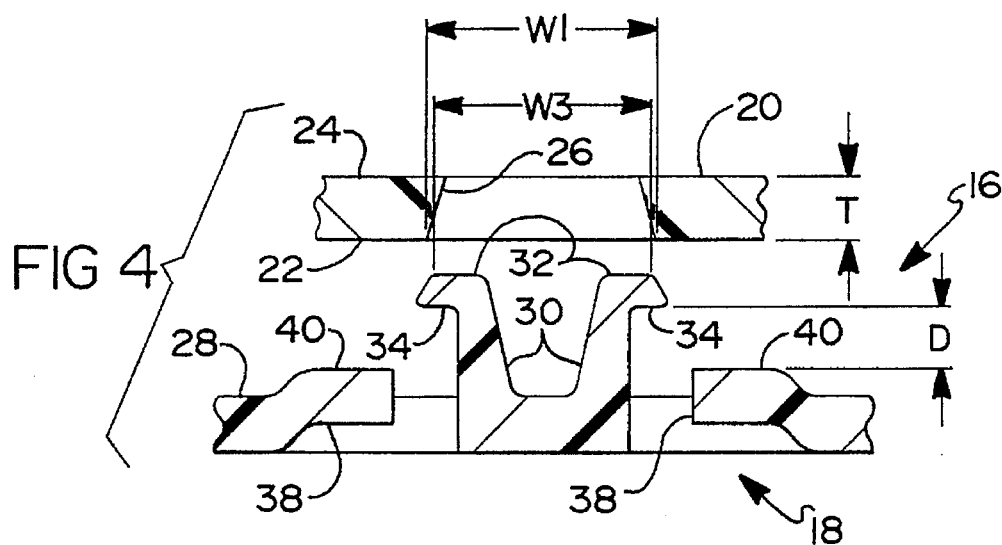
FIG. 4 is an enlarged sectional view of a clip member of FIG. 3 in the direction of the arrows and a receiving member of FIG. 2 in a direction of arrows 4 before engagement.
Figure 5:
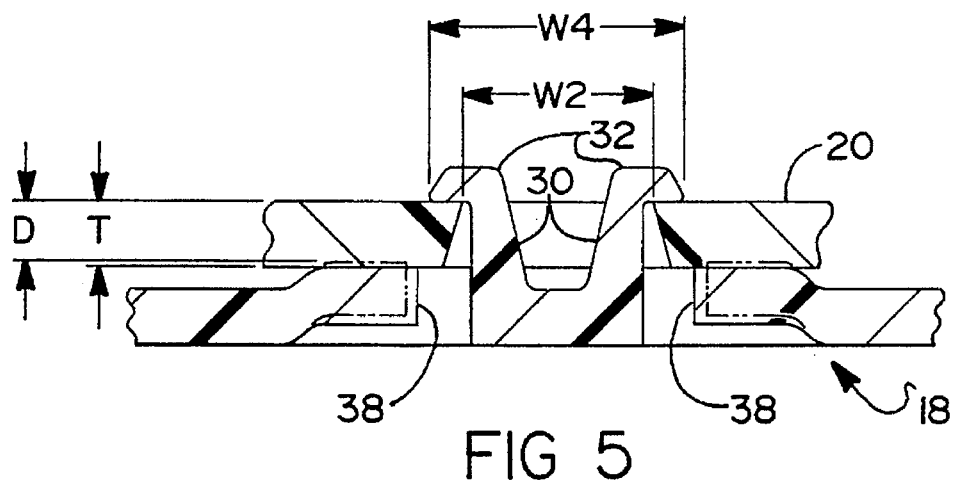
FIG. 5 is a sectional view of the clip member and receiving member of FIG. 4 after engagement.

A push clip fastener 16, as best shown in FIGS. 4 and 5, includes a clip member 18 and a receiving member 20. As is best seen in FIG. 3, clip member 18 is integral with first portion 12. As is best seen in FIG. 2, receiving member 20 is integral with second portion 14.

Referring once again to FIG. 4, receiving member 20 has a front surface 22 disposed toward clip member 18 and an oppositely facing back surface 24. Receiving member 20 has a predetermined thickness T from front surface 22 to back surface 24. An aperture 26 in receiving member 20 tapers from a first width W1 at front surface 22 to a narrower second width W2 at back surface 24. The taper helps ensure adequate engagement between clip member 18 and receiving member 20.

Clip member 18 has a base surface 28 from which outwardly project a pair of substantially parallel tangs 30. Each tang 30 has an engaging barb 32 disposed at its end. Barbs 32 taper outward from a first width W3 at an end of tangs 30 to a wider width W4 at barb engagement surfaces 34 of each barb 32. The taper facilitates entry of the barbs 32 into aperture 26.

A pair of cantilevered spring tabs 38, integral with first portion 12, extend parallel to base surface 28 and inward toward tangs 30. Spring tabs 38 each have tab engaging surfaces 40 which project above the base surface 28. Tab engaging surface 40 defines a distance D between itself and barb engagement surface 34. Distance D is greater than thickness T. Width W1 is greater than width W3. Width W4 is greater than width W2.

To join the clip member 18 with receiving member 20, as shown in FIG. 5, clip member 18 is aligned with aperture 26 and the parts forced together. Width W3 must be less than width W1 for clip member 18 to enter aperture 26. As barbs 32 enter aperture 26, the tapered surfaces of aperture 26 and barbs 32 force tangs 30 to bend toward each other as front surface 22 moves toward spring tab engaging surface 40. Because thickness T is greater than distance D, when front surface 22 first contacts spring tab engaging surface 40, tangs 30 are still being biased toward each other by aperture 26. Continued movement of retainer 20 against clip 18 deflects spring tabs 38 in the direction of relative retainer motion, developing a spring load between retainer 20 and clip 18. With continuing displacement, barb engagement surface 34 reaches back surface 24 as barb 32 exits aperture 26. Tangs 30 snap back to their unloaded position, returning the width across the barbs to W4 with the barb engagement surfaces 34 and thereby engaging the back surface 24. As shown in FIG. 5, spring tabs 38 deflect from their free position, shown in phantom, to a deflected position, shown in solid lines. The deflected spring tabs 38 apply a spring load against receiving member 20 which is resultantly biased against barb engagement surfaces 34. The spring load substantially eliminates any potential for relative movement, and resultant vibration and chatter, between first and second portions 12, 14 of fan shroud 10 at clip fastener 16.

A preferred embodiment has been disclosed. A worker of ordinary skill in the art would realize, however, that certain modifications would come within the teaching of this invention. For example, engaging bumps could be molded into receiving member 20 to produce the desired deflection and spring load with spring tabs 38 coplanar with base surface 28. Additionally, the location and orientation of the cantilever spring tabs can be varied. Instead of having their free ends most approximate to the tangs, the free ends of tabs 38 could be opposite the tangs. Yet another alternative would be to have the spring tabs disposed in an orientation normal to the tangs 30. The distance of the spring tabs from the tangs can also be varied. Additionally, the shape of the barbs can be varied, as can the shape of aperture 26. For example, the taper of aperture 26 could potentially be eliminated and longer barbs employed. As such, the following claims should be studied in order to determine the true scope and content of the invention.

We claim:

1. A motor vehicle fan shroud comprising:

a first shroud portion engaging a radiator of the motor vehicle;

a second shroud portion engaging the first shroud portion;

a receiving member integral with one of the first shroud portion and the second shroud portion having an aperture and having a predetermined material thickness between a front surface and a back surface; and a clip member integral with the other of the first shroud portion and the second shroud portion having a base surface, having a pair of substantially parallel tangs projecting outwardly from the base surface and each tang having an engaging barb and the tangs disposed in part within the aperture with barb engagement surfaces engaging the back surface, having a pair of cantilevered spring tabs each with a tab engaging surface engaging the front surface and adjacent the tangs and extending from the base surface substantially parallel thereto, the tab engaging surface defining a distance to the barb engagement surfaces in a unassembled condition less than the thickness of the receiving member, wherein, when the clip member is pressed into the aperture in the receiving member, the tangs are bent as the barbs enter through the front surface, the engaging surfaces of the spring tabs initially engage the front surfaces of the receiving member before the barbs exit this aperture at the rear surface, the spring tabs are deflected after initial engagement as the barbs move through the aperture and develop a spring load between the first shroud portion and the second shroud portion, and the tangs snap back after the barbs exit the aperture at the rear surface to engage the rear surface, thereby positively retaining the receiving member and maintaining the spring load between the first shroud portion and the second shroud portion.

* * * * *